UNITED STATES PATENT OFFICE.

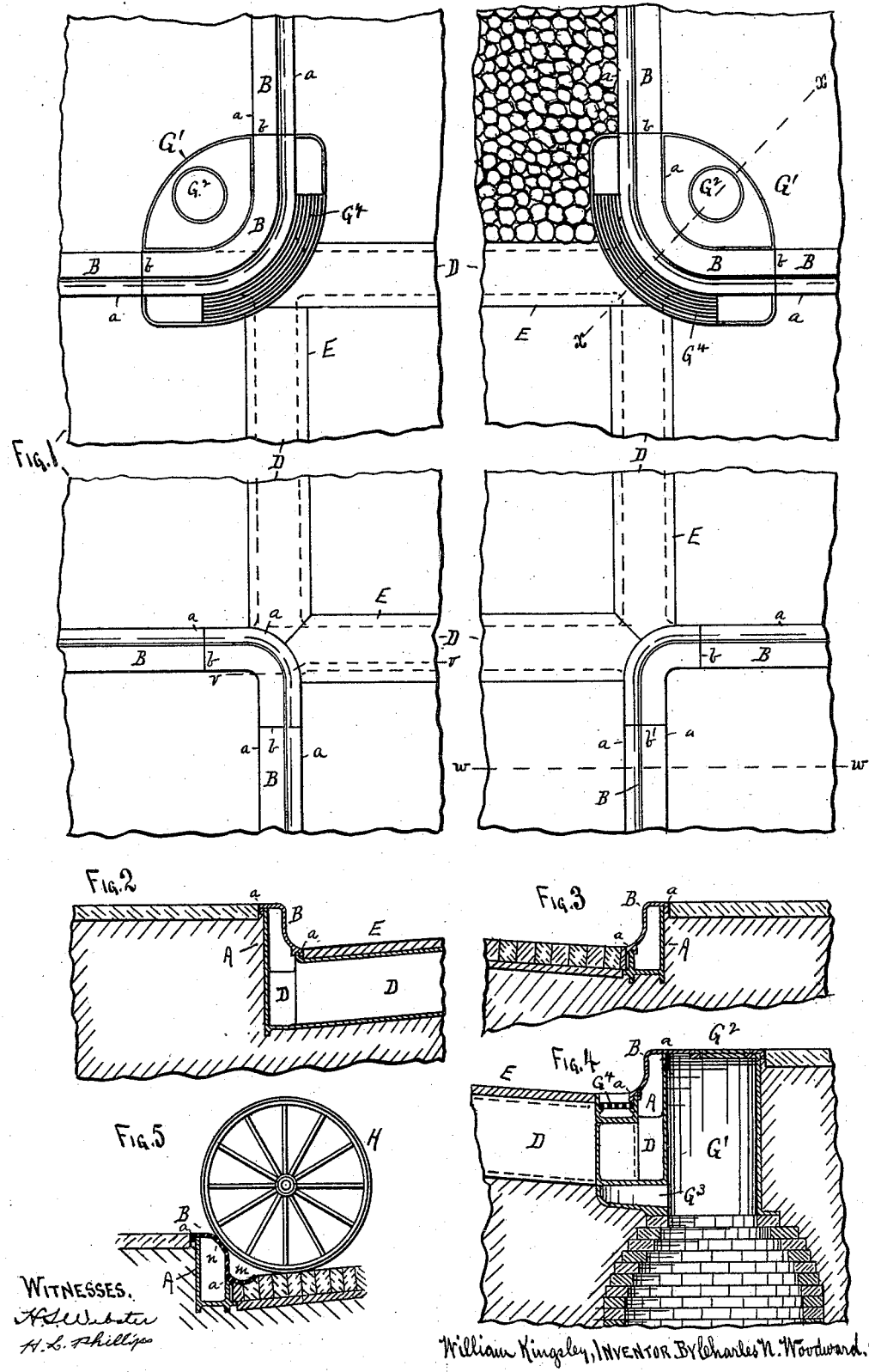

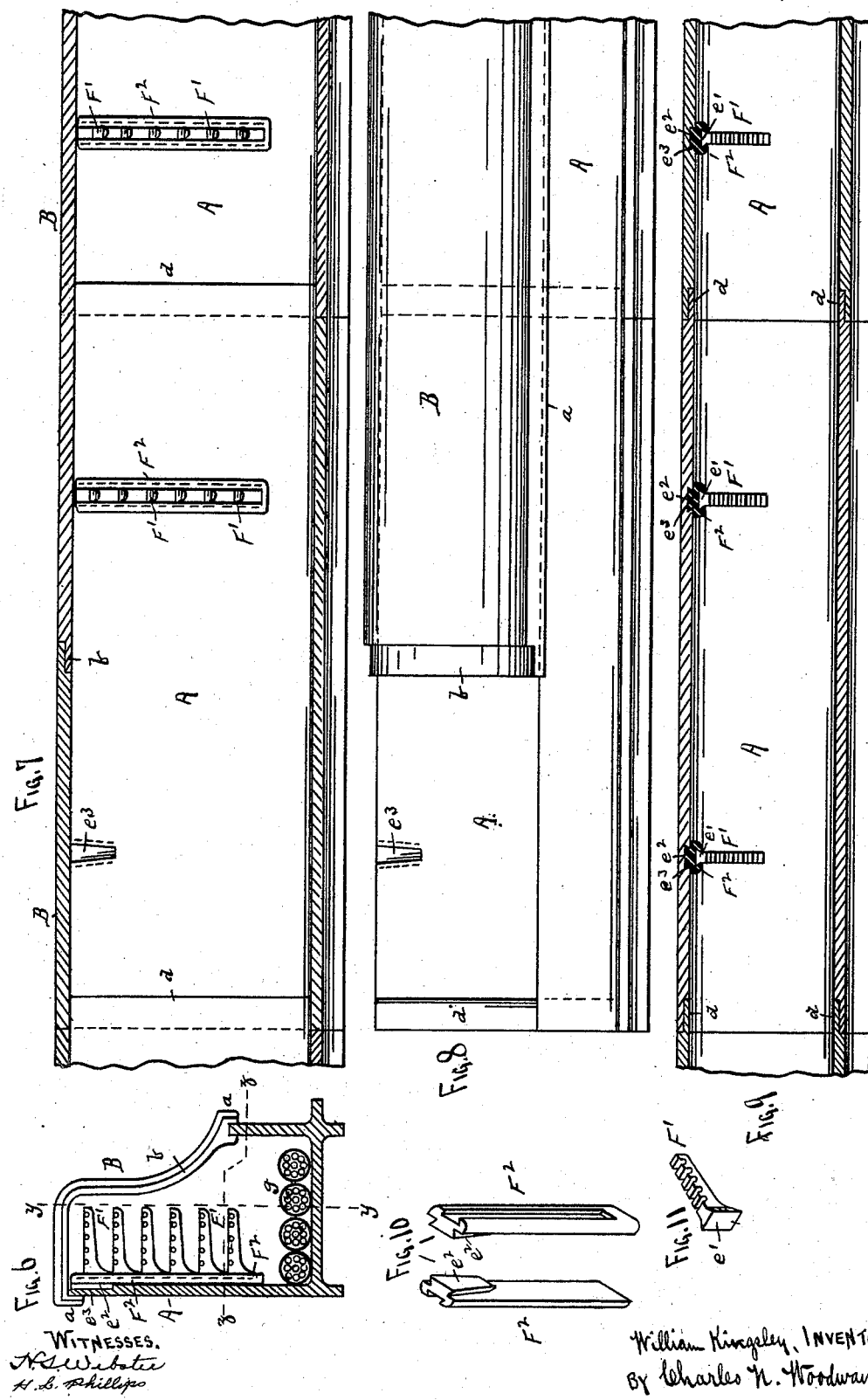

WILLIAM KINGSLEY, OF ST. PAUL, MINNESOTA.

COMBINED CURB, GUTTER, AND CONDUIT FOR ELECTRICAL CONDUCTORS.

SPECIFICATION forming part of Letters Patent No. 533,130, dated January 29, 1895.

Application filed February 1, 1893. Renewed November 15, 1894. Serial No. 528,929. (No model.)

*To all whom it may concern:*

Be it known that I, WILLIAM KINGSLEY, a citizen of the United States, residing at St. Paul, in the county of Ramsey and State of Minnesota, have invented certain new and useful Improvements in a Combined Curb, Gutter, and Conduit for Electrical Conductors, of which the following is a specification.

This invention relates to combined curbs, gutters, and conduits for electrical conductors, and consists in the construction, combination, and arrangement of parts, as hereinafter shown and described, and specifically pointed out in the claims.

In the drawings, Figure 1 is a diagram representing four corners of two streets, where they cross, with my combined curb, gutter and conduit arranged in connection with the paving and catch basins thereof. Fig. 2 is a sectional view on the line "v v" of Fig. 1. Fig. 3 is a sectional view on the line "w w" of Fig. 1. Fig. 4 is a sectional view on the line "x x" of Fig. 1. Fig. 5 is a view similar to Fig. 2, illustrating a slight modification in the construction. Fig. 6 is a cross sectional view, enlarged, of the conduit. Fig. 7 is a longitudinal section on the line "y y" of Fig. 6. Fig. 8 is a front elevation. Fig. 9 is a plan view in section on the line "z z" of Fig. 6. Fig. 10 represents perspective views of the front and rear of one of the cable bracket suspension hangers, detached, and Fig. 11 is a perspective view of one of the cable brackets detached.

The conduit consists of trough shaped sections A of metal or other suitable material, adapted to be placed along the street lines as substitutes for the curbing, and with removable covers B, as shown. The rear walls of the main conduit sections are higher than the front walls, while the bottoms are preferably set to a depth about on a line with the lower surface of the paving, and with the front walls about equal in height with the depth of the paving, as shown in Fig. 3. The cover sections B are formed to correspond with the difference in height of the two walls of the conduit and with the lower front portion curved as shown, to form the face of the gutter. The cover sections are arranged to fit loosely over the conduit sections, by lips *a*, or other means, and with overlapping joints *b*. The sections may be of any suitable length, but will preferably be about four feet long, the joints of the cover sections being preferably arranged to "break joints" or alternate with the joints of the conduit sections, as shown in Figs. 6 and 7.

The ends of the conduit sections will be formed with interlocking lips *d*, as shown, so that the sections will be supported by each other, and thus prevent any unequal heaving or settling by the action of the frost or otherwise.

In Fig. 5 I have shown a slight modification in the construction and form of the cover section, consisting in forming its upper outer portion *n* to conform substantially to the curve of the rims of vehicle wheels H, as shown, so that when vehicles are backed up against the curb, the wheels will come in contact with a larger surface of the cover section, thereby distributing the impact over a larger surface and decreasing the liability of breakage.

Another modification is also shown in Fig. 5 consisting in continuing the lower portion of the cover section outward away from the conduit, as shown at *m*, to form a gutter in connection with the conduit, which may be found advantageous under some circumstances and in some localities. Another advantage of the gutter portion is that it serves as a protector to the joint between the cover section and the front wall of the conduit, to prevent the entrance of water. This is an important feature, and adds greatly to the efficiency of the apparatus.

Where the conduits are to be conducted across streets or alleys, the corner sections are formed with downwardly projecting branches D, (see Figs. 2 and 4,) so that sections of the conduit may be connected thereto and carried across the street within the pavements, as shown in Figs. 1, 2, and 4. These sunken sections will be covered with one or more thicknesses or layers of planking E, to make the surface of the street uniform, while at the same time rendering the sunken sections easily accessible when required. The planking E, may be replaced by sections of other material, or made of the same material as the paving, if preferred. By this simple arrangement the whole length of the interior of the conduit is easily accessible at all times by merely removing the cover sections B, or the plank covers E.

When the conductors are of the cable form they will be merely laid along in the bottom of the conduits, as shown at $g$ in Fig. 6, but when individual wire conductors are employed, they will be supported at suitable intervals by brackets F', as shown. These brackets F' are each formed with a dovetail lug $e'$ on their rear ends adapted to fit into a corresponding dovetail groove in a hanger $F^2$, the latter having a tapered dovetailed "chock" or lug $e^2$ on its rear upper part, adapted to fit into a corresponding tapered dovetailed blind slot or cavity $e^3$ in the rear wall of the conduit sections. These hangers and brackets may be arranged at as many points as may be desired, but generally two in each section, as shown, will be sufficient. By this arrangement every conductor or cable is easily accessible throughout their whole lengths, and without the necessity for excavating streets or removing the conductors from the conduits.

New conductors or cables may be inserted, or old ones removed, without interfering with any of the others.

The conduits will preferably be embedded in concrete to render their position more secure.

Where catch basins G' occur the conduits will be arranged around the outside of the upper part with the man hole $G^2$ in the rear of the conduit, and with the street crossing branches running through the water duct $G^3$ of the receiver, the grating $G^4$ being longer than ordinary to compensate for the partial obstruction caused by the conduit branches.

Having thus described my invention, what I claim as new is—

1. A combined hollow curb and gutter having its front wall flush with the surface of the paving and with its rear wall flush with the sidewalk, and a curved removable cover forming the top and also the face or gutter surface of the hollow curb, substantially as and for the purpose set forth.

2. A combined hollow curb and gutter having its front wall flush with the surface of the paving and with its rear wall flush with the sidewalk, a curved removable cover forming the top and also the face or gutter surface of the hollow curb, in combination with a catch basin formed with its man-hole in the rear of said conduit, and with the branches for the roadway sections of said conduit passing through the inlet to said catch basin, substantially as and for the purpose set forth.

3. In a combined curb and gutter a series of inclined dovetailed sockets $e^3$ at suitable intervals and adapted to support brackets $F^2$ having dovetailed lugs fitting said sockets, said brackets having dovetailed channels in their faces, and notched hangers supported in said channels, substantially as and for the purpose set forth.

4. A combined hollow curb and gutter having its front wall flush with the surface of the paving and with its rear wall flush with the sidewalk, and a curved removable cover forming the top and also the face or gutter surface of the hollow curb, said cover sections having extended gutters $m$, substantially as and for the purpose set forth.

In testimony whereof I have hereunto set my hand in the presence of two subscribing witnesses.

WILLIAM KINGSLEY.

Witnesses:
C. N. WOODWARD,
H. V. MILLER.